United States Patent [19]

Hecht et al.

[11] Patent Number: 4,758,480
[45] Date of Patent: Jul. 19, 1988

[54] SUBSTRATE TAILORED COATINGS

[75] Inventors: Ralph J. Hecht, North Palm Beach; Abdus S. Khan, Palm Beach Gardens; Richard H. Barkalow, Palm Beach Shores, all of Fla.

[73] Assignee: United Technologies Corporation, Hartford, Conn.

[21] Appl. No.: 139,101

[22] Filed: Dec. 22, 1987

[51] Int. Cl.4 ............................................. B32B 15/00
[52] U.S. Cl. .................................. 428/680; 428/937; 148/428
[58] Field of Search .............. 428/610, 652, 678, 680, 428/937, 941, 553, 637; 427/423; 148/428

[56] References Cited

U.S. PATENT DOCUMENTS

| | | | |
|---|---|---|---|
| 3,928,026 | 12/1975 | Hecht et al. | 428/680 |
| 4,124,737 | 11/1978 | Wolfla et al. | 428/937 |
| 4,152,488 | 5/1979 | Schulke et al. | 428/678 |
| 4,198,442 | 4/1980 | Gupta et al. | 427/423 |
| 4,313,760 | 2/1982 | Dardi et al. | 428/678 |
| 4,339,509 | 7/1982 | Dardi et al. | 428/937 |
| 4,419,416 | 12/1983 | Gupta et al. | 428/678 |
| 4,447,503 | 5/1984 | Dardi et al. | 428/937 |
| 4,451,431 | 5/1984 | Naik | 428/678 |
| 4,512,817 | 4/1985 | Duhl et al. | 428/680 |
| 4,546,052 | 10/1985 | Nicoll | 428/680 |

*Primary Examiner*—John J. Zimmerman

[57] ABSTRACT

A class of protected coatings for superalloys is described in which the coatings compositions are based on the compositions of the underlying substrate. By tailoring the coatings to the substrate composition, diffusional stability results and the other mechanical properties of the coating such as coefficient of thermal expansion and modulus, are similar to that of the substrate. The coating contains 7.5–11% Al, 9–16% Cr, 0.1–0.5% Hf, 2–8% Ta, 0.01–0.8% Y, balance Ni along with other elements all chosen to be similar in type and quantity to the substrate composition.

4 Claims, 1 Drawing Sheet

SUBSTRATE TAILORED COATINGS

The Government has rights in this invention, pursuant to Contract No. F33615-78-C-5206 awarded by the Department of the Air Force. This application is a continuation-in-part of application Ser. No. 733,001 filed May 9, 1985 now abandoned.

DESCRIPTION

Technical Field

This invention relates to the field of protective overlay coatings for superalloy articles.

BACKGROUND OF THE INVENTION

A primary problem which must be addressed in order to improve the performance and longevity of gas turbine engines is that of oxidation of the high temperature turbine components. The structural superalloy materials employed for gas turbine components have some degree of inherent oxidation resistance, however, the compositional compromises necessary to achieve the ultimate in mechanical properties generally result in the reduction of the materials' oxidation resistance to below that which is required for long-term use. In addition, the trend in gas turbine engines is always towards increasing temperatures to improve performance and efficiency. The oxidation rate of materials increases dramatically with increasing temperature.

For these reasons, for at least twenty years it has been customary to use protective coatings on gas turbine engine components. Such coatings are two general types, the aluminide type and the overlay type. Aluminide-type coatings are produced by diffusing aluminum into the surface of the component at elevated temperature in order to provide an aluminum rich surface zone which increases the material's oxidation resistance by providing sufficient aluminum to develop a protective alumina scale and providing sufficient aluminum to reform this scale as it spalls from the surface under use conditions. The aluminide-type coatings are generally quite thin and are life limited by the further diffusion of the aluminum into the component and by spallation of the aluminum oxide surface scale, both of which ultimately reduce the surface aluminum level to below the level which will form an alumina surface scale. However, such coatings are desirable for high performance engines inasmuch as the components coated with aluminide coatings are found to have substantially enhanced resistance to thermal fatigue when compared with overlay coated parts.

Overlay-type coatings consist of a discrete layer of an oxidation resistance alloy which is deposited on the surface of the component by means which include, for example, vapor deposition or plasma spraying. Overlay coatings are generally developed to be inherently oxidation resistant but they are developed in large measure without much consideration of the substrate to which they are to be applied. Thus, for example, a single overlay coating composition may be applied to many different composition substrates. Of course, such overlay coatings are optimized for oxidation resistance by more or less trial and error approach in which coated samples are tested and the coating then modified and retested. However, such trial and error techniques start from an arbitrary oxidation resistant material baseline rather than from the substrate composition.

DISCLOSURE OF INVENTION

It is an object of this invention to describe techniques which can be used to develop substrates specific protective coatings by starting with the substrate composition and modifying it to improve its oxidation resistance without significantly reducing its other important properties.

It is another object of this invention to describe coated articles in which the substrate composition is highly similar to the coating composition.

These objects and others which will become apparent hereinafter are accomplished by the present invention.

Basically, a substrate composition is modified to arrive at the coating composition by increasing the aluminum contents somewhat, maintaining the chromium content at a level sufficient to guarantee the formation of an alumina surface layer, reducing the molybdenum and tungsten where present and substituting for them tantalum, and adding the elements yttrium, hafnium, and optionally silicon. The resultant coating has a microstructure which is similar to that of the substrate, in contrast to the microstructure of prior art overlay coatings which have had a variety of phases in the coating not found in the substrate.

The foregoing and other objects, features and advantages of the present invention will become more apparent from the following description of the best mode for carrying out the invention and the accompanying drawings.

BEST MODE FOR CARRYING OUT THE INVENTION

Figure 1:
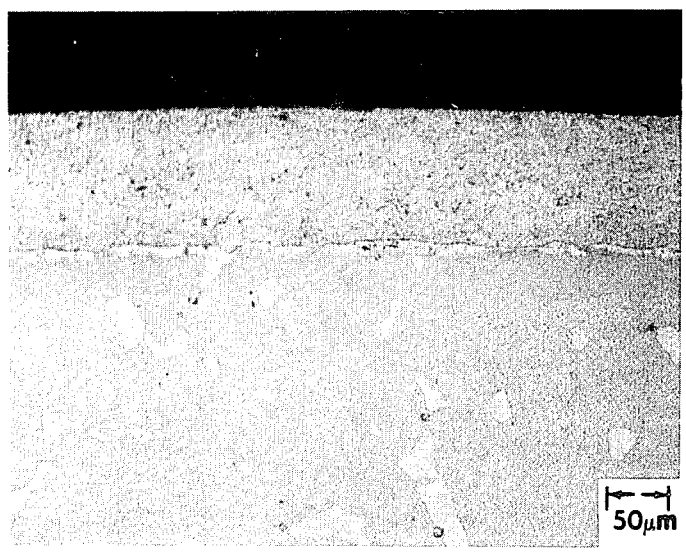
FIG. 1 is a photomicrograph showing a superalloy substrate having an invention overlay coating before high temperature exposure.

According to the present invention, coatings can be designed which are effective in protecting substrates and which are based on and derived from the substrate composition.

The microstructure of superalloys of commercial interest consists essentially of a gamma (nickel solid solution) matrix containing strengthening gamma prime precipitates (based on the phase $Ni_3Al$) A broad composition range which encompasses such commercial alloys is presented below in Table I.

TABLE I

| | (Wt. Percent) |
|---|---|
| Al | 3–7 |
| Ti | 0.5–5 |
| Cr | 5–18 |
| Co | 0–20 |
| Mo | 0–7 |
| W | 0–14 |
| Ta | 0–14 |
| Cb | 0–4 |
| V | 0–2 |
| Re | 0–4 |
| Hf | 0–0.1 |
| Y | 0–0.2 |
| C | 0–0.2 |
| B | 0–0.02 |
| Zr | 0–0.5 |
| Ni | bal |

Of course, Table I covers many superalloy compositions and those skilled in the art will be able to determine those compositions which are of particular utility for their applications. It is also known from copending U.S. application Ser. No. 565,492, to incorporate controlled amounts of certain minor elements in structural superalloy materials for the purposes of improving their oxidation resistance.

The coating which will be found to provide highly useful protection for such a substrate will microstructurally consist of at least 90 volume percent of the gamma and gamma prime phases and contain less than 10% by the volume of other phases such as the beta (NiAl) phase. This substantial microstructural similarity between the substrate and the coating goes a long way toward rendering the mechanical properties of the coating similar to the mechanical properties of the substrate, thereby reducing thermomechanically induced damage during service. It is preferred that the volume fraction of the gamma prime phase in the coating be similar to that of the substrate, although the aspects of the coating composition which will be subsequently described which involves increasing the the aluminum content will generally result in the coating having a gamma prime volume fraction which is somewhat greater than that of the substrate.

The desired coating composition is arrived at from the substrate composition by increasing the aluminum content sufficiently to insure that the oxide layer or scale which results in service, is alumina. In practice it will be found that aluminum content of from about 7.5 to 11 wt. % in the coating will provide this desired result. Less aluminum may not produce alumina scales, more aluminum will result in the formation of undesirable extraneous phases in the microstructure. Those skilled in the art know quite well that the nature of the oxide layer is determined not only by the aluminum content but also by the chromium content and for this reason it is preferred that the coating contain from about 9 to about 16 wt.% chromium.

Commercial structural superalloys are strengthened not only by the gamma prime phase but by additions of refractory metals which include tantalum, tungsten, molybdenum, rhenium and columbium. It is desirable that the coating be as similar as possible to the substrate composition but a variety of effects interfere with this goal. In particular, molybdenum and tungsten have both been found to have deleterious effects on the oxidation performance of superalloys. Consequently, even though some alloys may contain as much as 10 or 12 wt. % of these elements, it is desirable that in the coating composition they be limited to a maximum of about 4 wt. % each, and preferably a maximum of about 3 wt. % each. Reducing these elements in the coating composition will reduce its strength and thereby render it perhaps more susceptible to various coating performance problems which are related to mechanical properties. For this reasons, the molybdenum and tungsten can be replaced in whole or in part by tantalum which is found to have a beneficial effect on oxidation performance and will also provide a substantial strengthening effect. The tantalum content in this coating composition will range from 2 to 8 wt. %. When the molybdenum and tungsten levels are reduced it is desirable that the tantalum substitution be performed on an essentially equiatomic basis. Tantalum and tungsten (and also rhenium) have atomic weights of about 180 while molybdenum and columbium have atomic weights of about 90.

In order to compare the atomic percentages of the various refractory constituents, one can multiply the tantalum, tungsten and rhenium contents by half. Thus, for example, a substrate containing 3 wt. % tantalum, 9 wt. % tungsten, 1 wt. % molybdenum would have its tantalum and tungsten content multiplied by one half and its molybdenum content multiplied by one in order to arrive at a comparative number 7 and this number could then be compared with that of a coating containing 6 wt. % tantalum which would have an effective number of 3. Thus, the coating in this case would have 43% of the atomic percentage of refractory metals when compared with the substrate. It is preferred that on an atomic basis that the coating contain at least 30% of the refractory composition of the substrate and preferably at least 40%.

The refractory metals include tantalum, tungsten, molybdenum, rhenium and columbium and the previously mentioned number of 30% and preferably 40% should be applied to the total of the tantalum, tungsten, molybdenum, rhenium and columbium in the substrate and in the coating. Since only tungsten and molybdenum are known to be detrimental to oxidation resistance it is possible to substitute for some tungsten and molybdenum by increasing the rhenium and columbium levels as well as the previously mentioned increase in tantalum, but increasing the tantalum level is the preferred approach.

Other major elements found in commercial superalloys are titanium and cobalt. Titanium has been occasionally observed to have a somewhat detrimental effect on oxidation resistance and it is therefore preferred that the titanium content in the coating be reduced relative to that in the substrate; in most cases complete elimination of titanium will be found to be most desirable. Preferably, the titanium content in the coating should be less than 50% of that in the substrate. On the other hand, cobalt basically has very little effect on the oxidation performance of the coating material and consequently it may be present in an amount up to 125% of that of the substrate composition meaning that if the substrate contains 10 wt. % cobalt the coating could contain anywhere from 0 to 12½ wt. % cobalt according to the teachings of the present invention.

The commercial overlay coatings are generically referred to as MCrAlY coatings in which M may be nickel, cobalt or iron and mixtures of nickel and cobalt, Cr is chromium, Co is cobalt, and Y IS yttrium. Yttrium is present in amounts on the order of ½ to 1 wt. % but has a powerful effect on the oxidation resistance of the material. In some fashion, the yttrium acts to render the oxide scale which forms on the coating material very adherent to the coating material thereby substantially reducing spallation. A variety of elements, sometimes referred to as oxygen active elements, have been proposed to replace or supplement the yttrium content. These include lanthanum and cerium for replacement of yttrium and hafnium and silicon to supplement the yttrium. Other patents which relate to the concept of oxygen active elements in overlay coatings include U.S. Pat. Nos. 4,419,416; 4,086,391 and 4,034,142, which are incorporated herein by reference.

Such oxygen active elements are essential to the success of the present invention and—yttrium is added in amounts of from 0.01 to 0.8% by weight, hafnium is added in amounts of 0.01 to 0.5% by weight, zirconium may be added in amounts of up to 0.5% by weight, and silicon may be added in an amount of up to 2% by weight. The yttrium and hafnium act to improve the adherence of the oxide layer while the silicon apparently acts by modifying the oxide layer so as to render it more resistant to the diffusion of oxygen.

There are several other minor elements which are commonly added to superalloy articles, particularly the polycrystalline superalloy articles. These elements are carbon, boron and occasionally vanadium. Carbon and boron (as well as zirconium) are commonly added to polycrystalline superalloy articles for the purposes of enhancing grain boundary ductility. These elements apparently have a somewhat detrimental effect on oxidation resistance and they are generally not favored for addition to coatings according to the present invention. Vanadium is added to certain superalloys for the purposes of improving mechanical properties such as tensile strength and since it has been found to have an adverse effect on oxidation, no intentional additions of vanadium are made to the present invention.

A primary benefit of the present invention which has not been fully discussed heretofore is the improvement in diffusional stability exhibited by the invention. Those skilled in the metallurgy art appreciate that when different compositions of materials are joined together and then heated to elevated temperatures, diffusion occurs between the two articles. The driving force for such diffusion is the difference in composition. In the case of overlay coatings, where the inherent oxidation resistance of the coating is the result of the alumina layer scale which forms in service, the coating can degrade from two basic mechanisms. The first is the perhaps obvious external mechanism of scale spallation. Since the scale is based on $Al_2O_3$, every time the scale spalls, a certain quantity of aluminum is lost from the surface layer. Eventually, through this mechanism, the aluminum content of the surface composition of the coated article will drop below that necessary to produce an aluminum oxide layer. When this happens, other complex compounds such as spinels form and subsequent oxidation is extremely rapid, if not catastrophic.

The internal coating degradation mechanism involves diffusion of materials either from the substrate into the coating or from the coating into the substrate. In the first instance, for example, molybdenum and/or tungsten in the underlying substrate can diffuse into the surface of the coating and thereby interfere with the formation of protective scales. In the latter instance, an essential element from the coating such as chromium or aluminum, can diffuse into the substrate thereby eventually depleting the surface layer of chromium and/or aluminum so that the scale which forms on the outer surface of the coated article is no longer alumina. It is this latter internal mechanism which is addressed by tailoring the substrate and coating compositions to each other.

The depth of interdiffusion between the coating and the substrate can be evaluated by optical microstructural evaluation. This is done by observing what is referred to as the diffusion zone between the substrate and the coating and this zone is delineated by a change in the phases present.

The various substrate and coating compositions discussed below are presented in Table II. FIG. 1 shows an optical photomicrograph of as-processed superalloy substrate having thereon an MCrAlY coating according to the invention. A slight interdiffusion zone (approximately 10 microns) can be seen, the result of coating-substrate interaction during the elevated temperature deposition process and a 1975° F./4 hour heat treatment which is a conventional heat treatment used to improve the adherence of the coating to the substrate.

Figure 2:
FIG. 2 shows the coated article of FIG. 1 after a 100 hour exposure at 2100° F.

FIG. 2 shows the appearance of the invention coated substrate after 100 hours of exposure at 2200° F. The width of the interdiffusion zone is seen to be only slightly greater (approximately 15 microns) than that of the FIG. 1 diffusion zone. Table II also describes another substrate/coating combination according to the invention. This combination showed an approximately 15 micron diffusion zone before testing and about 20 microns after 100 hours at 2100° F.

This is in contrast to a conventional substrate/coating combination which went from a 15 micron diffusion zone at the start to a 90 micron diffusion zone—if tested at 2200 F. it is estimated that the diffusion zone would have consumed the entire coating after 100 hours at 2200° F.

Thus it can be seen that the coating illustrated in FIGS. 1 and 2, which was based on the substance composition, was substantially more diffusion resistant than the arbitrarily developed prior art coating composition.

TABLE II

| | FIGS. 1 & 2 (Invention) | | (Invention) | | (Prior Art) | |
|---|---|---|---|---|---|---|
| | Substrate (Wt. %) | Coating (Wt. %) | Substrate (Wt. %) | Coating (Wt. %) | Substrate (Wt. %) | Coating (Wt. %) |
| Cr | 10 | 12 | 9 | 9.2 | 9 | 18 |
| Co | 5 | — | 5 | — | 10 | 23 |
| W | 4 | 4 | 9 | — | 12 | — |
| Cb | — | — | — | — | 1 | — |
| Ta | 12 | 3 | 3 | 6.3 | — | — |
| Mo | — | — | 1 | — | — | — |
| Ti | 1.5 | — | 1.5 | — | 2 | — |
| Al | 5 | 8 | 7 | 9.8 | 5 | 12.5 |
| B | — | — | — | — | 0.015 | — |
| Hf | — | 0.3 | — | 0.27 | 2 | — |
| Y | — | 0.3 | — | 0.21 | — | 0.3 |
| Ni | Bal | Bal | Bal | Bal | Bal | Bal |

Because of the similarity of the coating and substrate compositions, the mechanical properties are also well matched. Thus, for example, in a thermal fatigue test in which the onset of coating failure in a conventional overlay coated substrate is observed after 6000 cycles, a variety of substrate tailored coatings developed according to the present invention does not show signs of failure until experiencing between 7000 and 11,000 cycles.

In terms of oxidation resistance, the previously mentioned diffusion tests are a good predictor of oxidation resistance; the negligible diffusion zone shown in FIG. 2 indicates that the alloy remains able to form the necessary protective alumina scale. In fact, whereas a conventional overlay coating when tested at 2100° F. has a life of about 300 hours, the coating according to the present invention was tested for over 800 hours at a higher temperature of 2200° F. without displaying any signs of incipient failure.

Although this invention has been shown and described with respect to a preferred embodiment, it will be understood by those skilled in this art that various changes in form and detail thereof may be made without departing from the spirit and scope of the claimed invention.

We claim:

1. An oxidation resistant article which comprises:

a superalloy substrate, having a microstructure which consists essentially of a gamma phase matrix containing gamma prime precipitates, consisting of (by wt.) 3–7% Al, 0.5–5% Ti, 5–18% Cr, 0–20% Co, 0–7% Mo, 0–14% W, 0–10% Ta, 0–4% Cb, 0–2% V, 0–4% Re, 0–0.1% Hf, 0–0.2% Y, 0–0.2% C, 0–0.02% B, 0–0.2% Zr, balance essentially Ni;

a coating on said substrate, said coating being derived from and being compositionally similar to said substrate, said coating having a microstructure which contains at least 90% by volume of the gamma and gamma prime phases, consisting of (by wt.) 7.5–11% Al, 9–16% Cr, less than 4% Mo, less than 4% W, 2–8% Ta, (said tantalum being added as an equiatomic replacement for at least some of said W and Mo when these elements are present in quantities of more than about 4), 0–3% Re, 0–4% Cb, with the atomic percent of Ta+W+Mo+Re+Cb, the coating being at least 30% of the atomic percent of the Ta+W+Mo+Re+Cb in the substrate, 0.01–0.8% Y, 0.1–0.5% Hf, 0–2% Si, with no intentional additions of V, C, B or Zr, and containing Ti, in an amount less than the Ti content of the substrate composition, and the element Co in an amount up to 125% of the substrate composition, balance essentially Ni;

said coating developing a stable alumina scale upon exposure to elevated temperature oxidizing conditions, and said coating and said substrate being diffusionally stable and having similar coefficients of thermal expansion so that said coated article is adapted to resist oxidation and thermal fatigue for extended periods.

2. An article as in claim 1 in which the Mo and W levels in the coating are each less than 3% by weight.

3. An article as in claim 1 in which all of the elements in the coating (except for Hf, Y, Si) are present in the substrate.

4. An article as in claim 1 in which the Ti content is less than 50% of the substrate Ti content.

* * * * *